United States Patent
Li et al.

(10) Patent No.: US 9,372,286 B2
(45) Date of Patent: Jun. 21, 2016

(54) METHOD OF FORMING DUAL SIZE MICROLENSES FOR IMAGE SENSORS

(71) Applicant: OmniVision Technologies, Inc., Santa Clara, CA (US)

(72) Inventors: Jin Li, San Jose, CA (US); Gang Chen, San Jose, CA (US); Yin Qian, Milpitas, CA (US); Hsin-Chih Tai, San Jose, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 577 days.

(21) Appl. No.: 13/860,859

(22) Filed: Apr. 11, 2013

(65) Prior Publication Data

US 2014/0306360 A1    Oct. 16, 2014

(51) Int. Cl.
*B05D 1/00*    (2006.01)
*G02B 3/00*    (2006.01)
*B29D 11/00*    (2006.01)

(52) U.S. Cl.
CPC .............. *G02B 3/0018* (2013.01); *B05D 1/005* (2013.01); *B29D 11/00365* (2013.01); *B29D 11/00384* (2013.01); *B29D 11/00451* (2013.01); *G02B 3/0043* (2013.01)

(58) Field of Classification Search
USPC .......................................................... 264/1.7
See application file for complete search history.

(56) References Cited

U.S. PATENT DOCUMENTS

| 5,466,926 | A | 11/1995 | Sasano et al. |
|---|---|---|---|
| 8,097,890 | B2 | 1/2012 | Qian et al. |
| 2005/0078377 | A1* | 4/2005 | Li .................... B29D 11/00278 359/619 |
| 2008/0011936 | A1 | 1/2008 | Kuo et al. |
| 2012/0043634 | A1 | 2/2012 | Kurihara |
| 2012/0104525 | A1* | 5/2012 | Wu ...................... G02B 3/0018 257/432 |

OTHER PUBLICATIONS

TW 102139147—First Taiwan Office Action with English translation, issued May 14, 2015, 6 pages.
Huo, Y. et al., "Microlens performance limits in sub-2 μm pixel CMOS image sensors," SPIE-IS&T Electronic Imaging, SPIE vol. 7250, 725005, 2009, 10 pages, doi: 10.1117/12.807007.

* cited by examiner

*Primary Examiner* — Jacob Thomas Minskey
(74) *Attorney, Agent, or Firm* — Blakely Sokoloff Taylor & Zafman LLP

(57) ABSTRACT

A method of forming microlenses for an image sensor having at least one large-area pixel and at least one small-area pixel is disclosed. The method includes forming a uniform layer of microlens material on a light incident side of the image sensor over the large-area pixel and over the small-area pixel. The method also includes forming the layer of microlens material into a first block disposed over the large-area pixel and into a second block disposed over the small-area pixel. A void is also formed in the second block to reduce a volume of microlens material included in the second block. The first and second blocks are then reflowed to form a respective first microlens and second microlens. The first microlens has substantially the same effective focal length as the second microlens.

20 Claims, 18 Drawing Sheets

METHOD OF FORMING DUAL SIZE MICROLENSES FOR IMAGE SENSORS

TECHNICAL FIELD

This disclosure relates generally to microlenses, and in particular but not exclusively, relates to microlenses for image sensors.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of these image sensors.

Conventional CMOS image sensors typically include an array of pixels, where each pixel includes a photodiode that transforms incident light into an electrical charge. Each individual pixel has an output that, for a fixed exposure time, eventually saturates with increasing light intensity. Saturation of the photodiodes can produce unwanted image smearing due to an effect known as blooming, where excess charge spreads into neighboring pixels.

Full-well-capacity is the measure of the amount of charge which can be accumulated in the photodiode before such saturation occurs. As the pixel-size of CMOS image sensors become smaller, the active area of the photodiode is also reduced. The smaller photodiode area leads to a smaller full-well-capacity. The reduced full-well-capacity typically means a lower dynamic range and lower signal-to-noise ratio.

Recently, CMOS image sensors have been fabricated that include both large-area and small-area pixels so as to increase the dynamic range of the image sensor. That is, large-area pixels, with corresponding large photodiode areas, may be used for low-light conditions, whereas small-area pixels, with corresponding small photodiode areas, may be used for non-low-light conditions. However, conventional fabrication techniques may not necessarily translate when fabricating an image sensor that includes both large-area and small-area pixels. For example, the traditional methods of forming microlenses over an array of pixels may need to be updated so as allow for the formation of dual-sized microlenses corresponding with the small-area and large-area pixels.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a Method of Forming Dual Size Microlenses for Image Sensors are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
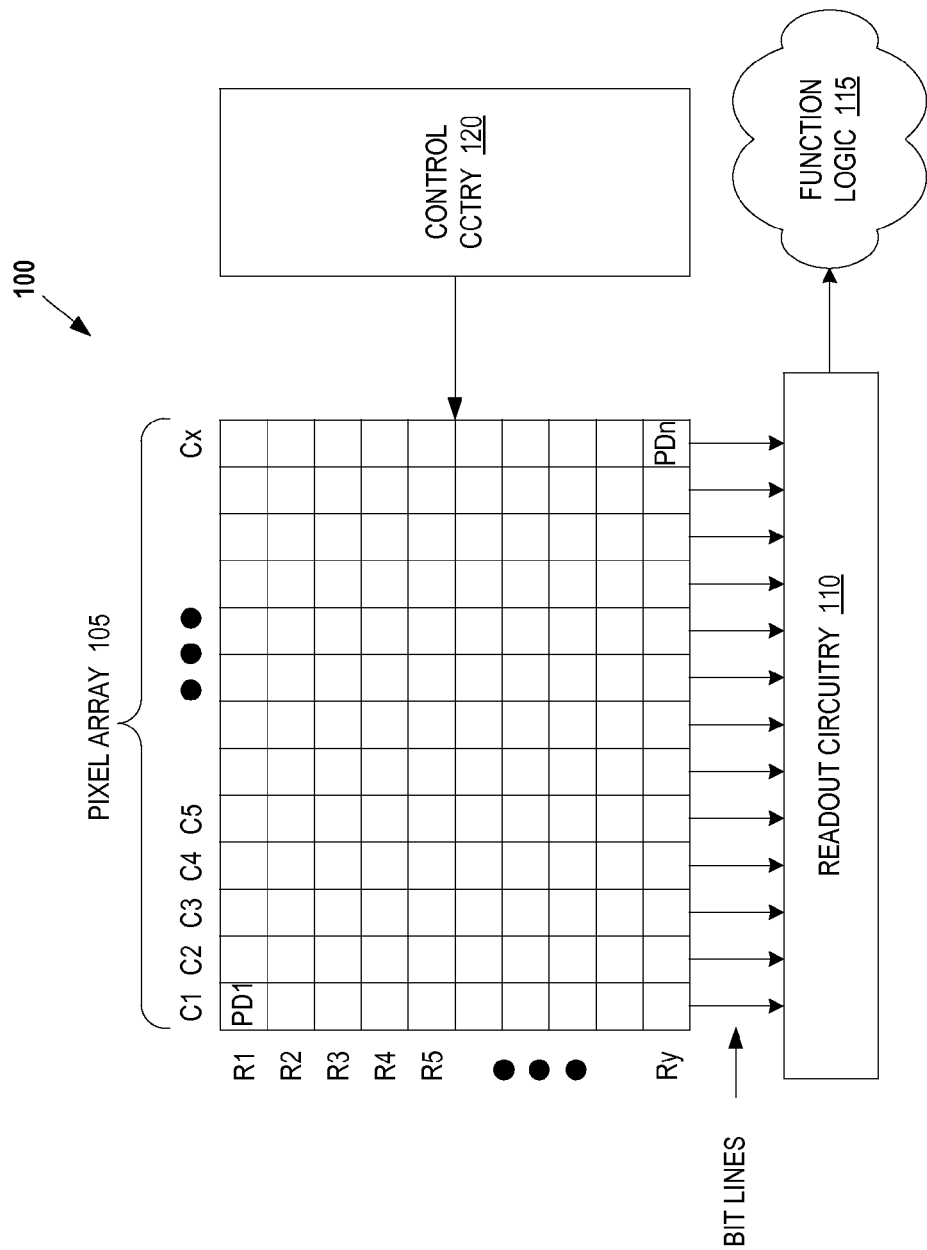
FIG. 1 is a block diagram illustrating an image sensor, in accordance with an embodiment of the present disclosure.

FIG. 1 is a block diagram illustrating an image sensor 100, in accordance with an embodiment of the present disclosure. The illustrated embodiment of image sensor 100 includes an active area (i.e., pixel array 105), readout circuitry 110, function logic 115, and control circuitry 120.

Pixel array 105 may be a two-dimensional array of backside or frontside illuminated imaging pixels (e.g., pixels PD1, . . . , Pn). In one embodiment, each pixel is an active pixel sensor ("APS"), such as a complementary metal-oxide-semiconductor ("CMOS") imaging pixel. As illustrated, each pixel is arranged into a row (e.g., rows R1 to Ry) and a column (e.g., column C1 to Cx) to acquire image data of a person, place, or object, which can then be used to render an image of the person, place, or object. As will be discussed in more detail below, pixel array 105 may include at least two different sized pixels. For example, pixel array 105 may include two sizes of pixels, where small-area pixels are interleaved with large-area pixels within array 105.

After each pixel has acquired its image data or image charge, the image data is read out by readout circuitry 110 and transferred to function logic 115. Readout circuitry 110 may include amplification circuitry, analog-to-digital conversion circuitry, or otherwise. Function logic 115 may simply store the image data or even manipulate the image data by applying post image effects (e.g., crop, rotate, remove red eye, adjust brightness, adjust contrast, or otherwise). In one embodiment, readout circuitry 110 may read out a row of image data at a time along readout column lines (illustrated) or may readout the image data using a variety of other techniques (not illustrated), such as a serial readout or a full parallel readout of all pixels simultaneously.

Control circuitry 120 is coupled to pixel array 105 to control operational characteristics of pixel array 105. For example, control circuitry 120 may generate a shutter signal for controlling image acquisition.

Figure 2:
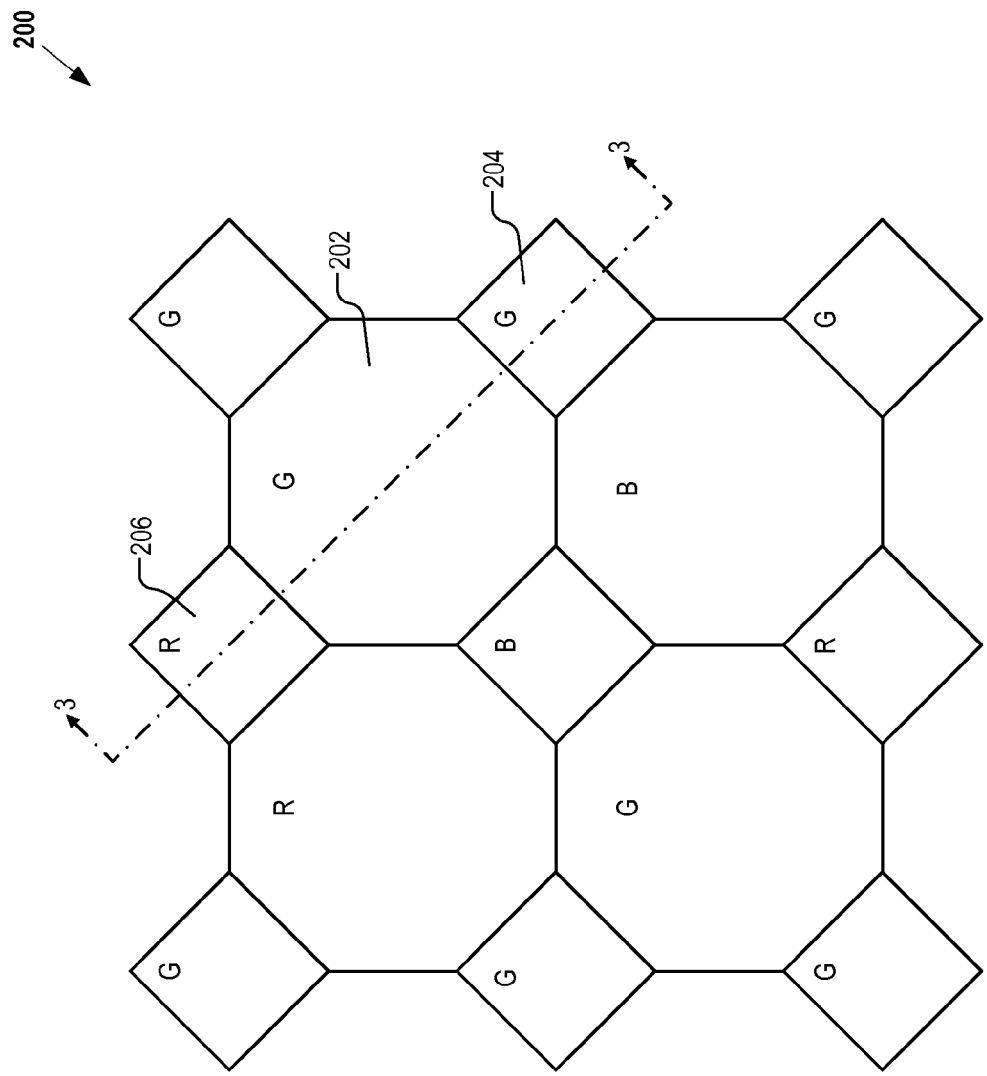
FIG. 2 is a plan view of an array of pixels of an image sensor illustrating large-area and small area pixels, in accordance with an embodiment of the present disclosure.

FIG. 2 is a plan (i.e., top) view of an array 200 of pixels of an image sensor illustrating interleaved large-area and small area pixels, in accordance with an embodiment of the present disclosure. Array 200 is one possible implementation of a portion of pixel array 105 of FIG. 1. As shown, array 200 includes four large-area pixels, including large-area pixel 202, and nine small-area pixels, including small-area pixels 204 and 206. In the illustrated embodiment, the large-area pixels are octagonal in shape and the small-area pixels are square. However, other shapes of both the large-area and small-area pixels may be implemented in accordance teachings of the present disclosure.

In one embodiment, array 200 is a color pixel array that assigns color to each pixel through use of color filters. Color filters assign a separate color to each pixel by placing a filter of that color over the pixel. As photons pass through a filter of a certain color to reach the pixel, only wavelengths of that color will pass through. Other wavelengths will be absorbed. In the illustrated example, the array 200 includes red (R), green (G), and blue (B) color filters. However, in other embodiments, array 200 may include cyan, magenta, and yellow color filters. The color filters of array 200 may be arranged into what is commonly referred to as a Bayer pattern that includes alternating rows of red filters wedged between green filters and blue filters wedged between green filters. In the illustrated example of FIG. 2, the small-area pixels are arranged in a Bayer pattern that is independent from the Bayer pattern in which the large-area pixels are arranged. That is, array 200 includes two separate Bayer patterns of color filters, one for the large-area pixels, and another for the small-area pixels. In operation, the charge accumulated only in the large-area pixels may be read out during low-light conditions, whereas the charge accumulated only in the small-area pixels may be read out during non-low-light conditions.

The fill factor of each pixel denotes the fraction of the area of a pixel that is sensitive to light, whereas the pitch of a pixel is the physical distance between the pixels in an imaging device. Pixel fill factor has become smaller as pixel pitch has been reduced because the active circuit elements and metal interconnects consume increasing amounts of area in each pixel. One way to address the loss of fill factor is to use a microscale lens (microlens) directly above each pixel to focus the light directly towards the photosensitive portion of the area within the pixel.

Figure 3:
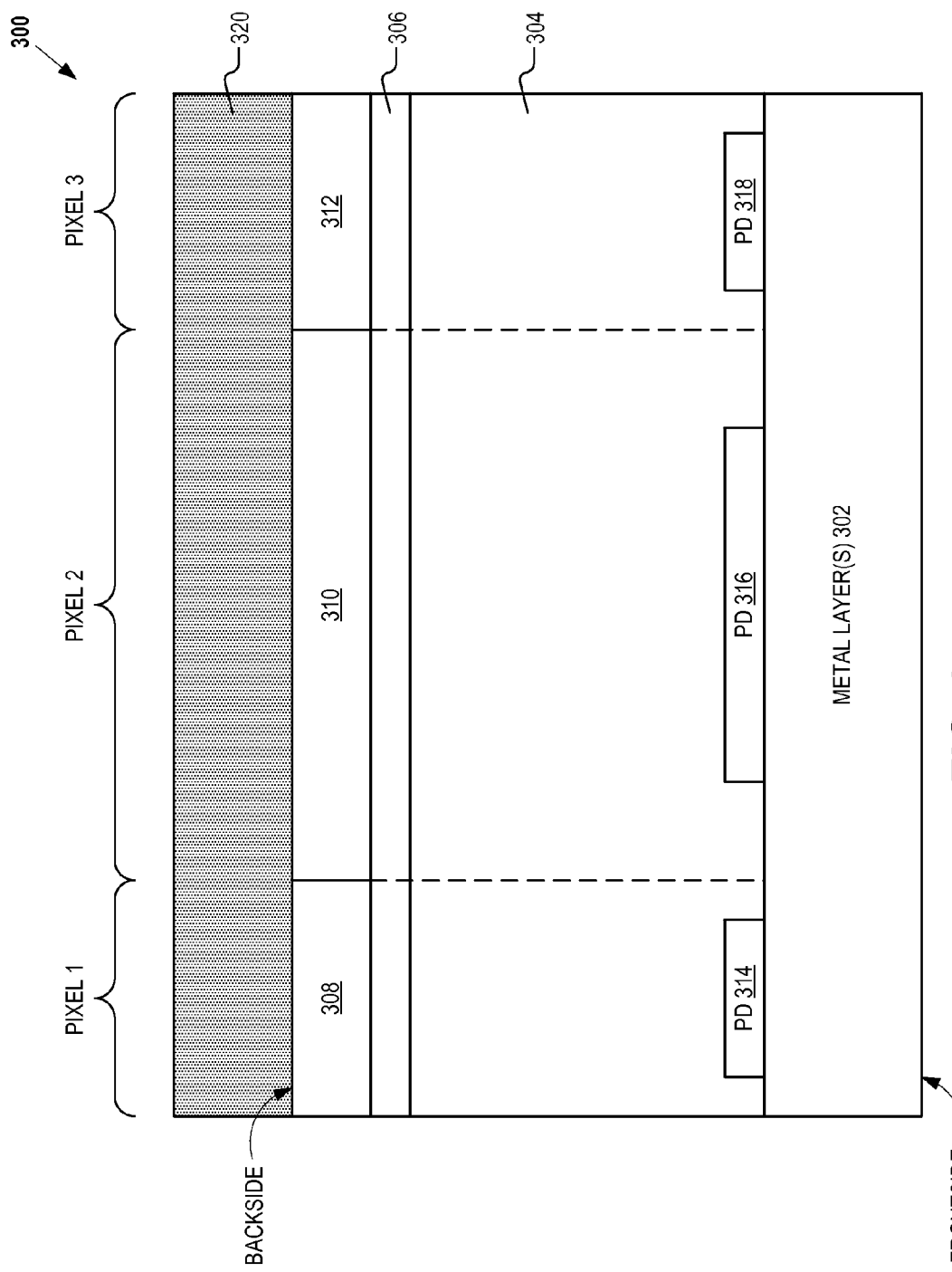
FIGS. 3-6 are cross-sectional views of an imaging sensor illustrating a process of forming dual size microlenses.

FIGS. 3-6 are cross-sectional views of pixel array 200, taken along section line 3-3 of FIG. 2, illustrating a process of forming microlenses on pixel array 200. FIG. 3 is a cross-sectional view of three pixels (i.e., PIXEL 1, PIXEL 2, and PIXEL 3) of a backside illuminated imaging (BSI) sensor during a first processing step of forming microlenses. Pixel 1 may correspond to small-area pixel 206 of FIG. 2, while pixel 2 corresponds to large-area pixel 202, and pixel 3 corresponds to small-area pixel 204.

Formation of the microlenses may typically be done during the back-end processing of imaging sensor 300. Thus, several features of imaging sensor 300 have already been formed prior to formation of the microlenses. In particular, the illustrated example of imaging sensor 300 is shown as already including a metal layer(s) 302 disposed on a front side (i.e., the bottom side as oriented in FIG. 3) of semiconductor substrate 304 and a planarization/passivation layer 306 disposed on a backside (i.e., the top side) of the semiconductor substrate 304. Each pixel of imaging sensor 300 is shown as also including a color filter (i.e., 308-312) and a light sensitive element (i.e., photodiodes 314-318). Photodiodes 314 and 318 are small-area photodiodes, having relatively small photosensitive areas, while photodiode 316 is a large-area photodiode having a larger photosensitive area.

Imaging sensor 300 is a backside illuminated imaging sensor where light is incident on the backside of imaging sensor 300. Thus, for backside illuminated imaging sensors, the microlenses are formed on the backside. However, embodiments disclosed herein are equally applicable to front side illuminated (FSI) imaging sensors as well. In these embodiments (not shown), the microlenses, as well as the color filters are formed on the front side of the imaging sensor to receive incident light from the front side of the imaging sensor.

As shown in FIG. 3, the process of forming microlenses for imaging sensor 300 may include first forming a uniform layer of microlens material 320 on the light-incident side (e.g., backside) of the imaging sensor 300. For some embodiments, microlens material 320 may be disposed using spin-coating techniques, blanket deposition techniques, or other methods suitable for disposing the microlens material 320 in a uniform and substantially planar manner. The microlens material 320 may be any suitable material, such as a transparent thermoplastic that include photosensitizers to make it photosensitive (i.e., to make it a photoresist material). One suitable transparent thermoplastic may include Polymethl Methacrylate (PMMA).

Figure 4:
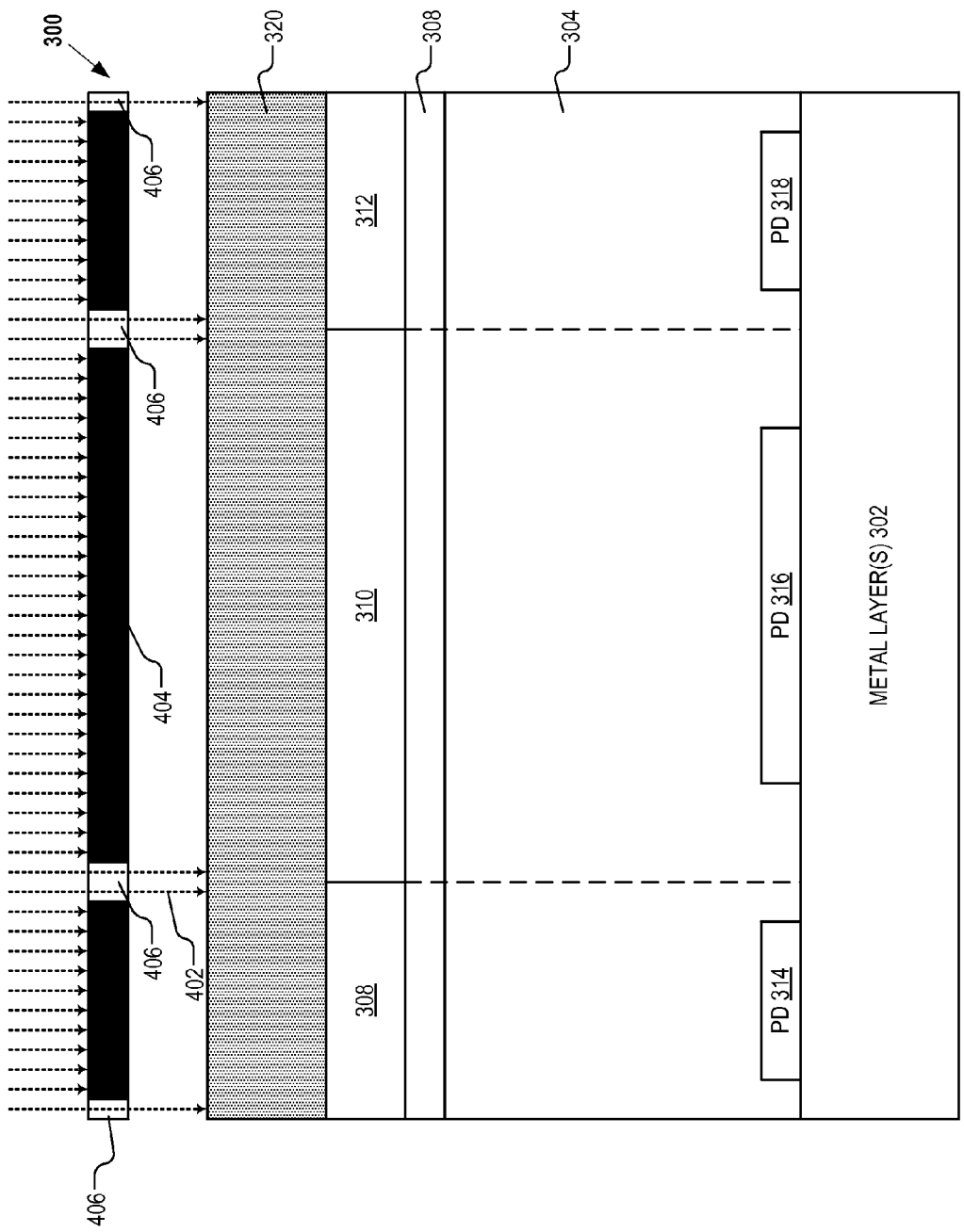

A next step in the fabrication process of the microlenses in shown in FIG. 4, where microlens material 320 (i.e., photoresist material) is exposed to a pattern of light 402. The pattern of light 402 may be formed by shinning light through photomask 404 that includes several openings 406 (i.e., transparencies). However, in other embodiments (not shown), maskless photolithography techniques may be implemented where a precise beam of light is projected onto the microlens material 320 without a photomask.

The embodiment of FIG. 4 illustrates the use of microlens material 320 that is a positive photoresist. In embodiments where a positive photoresist is used, the portion of the microlens material 320 that is exposed to the pattern of light 402 becomes soluble to a developer solution and the portion of the microlens material 320 that is unexposed remains insoluble to the developer solution. However, embodiments of the present invention are equally applicable to the use of a negative photoresist as the microlens material 320, where portions of the microlens material 320 that are exposed to the pattern of light become relatively insoluble to the developer solution, and unexposed portions are dissolved by the developer solution.

Figure 5:
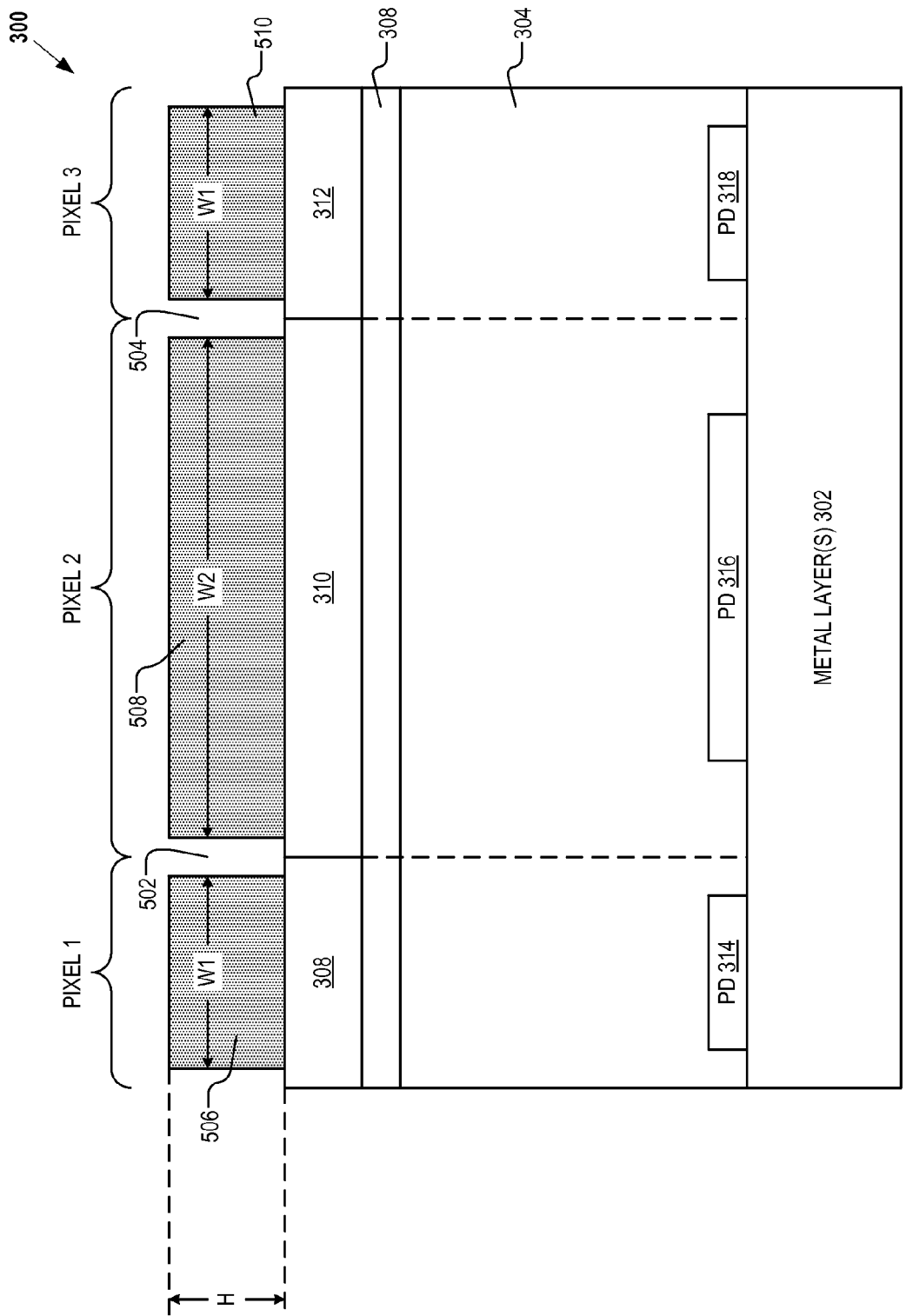

As mentioned above, photomask 404 includes openings 406. Openings 406 are aligned with regions between individual pixels, such that one block of microlens material is formed for each pixel after development. For example, FIG. 5 illustrates imaging sensor 300 after development of the exposed microlens material 320. As shown, the exposure of microlens material in the regions between pixels has allowed the formation of gaps 502 and 504 to separate the microlens material into blocks. In particular, PIXEL 1 now includes a block 506 of microlens material, PIXEL 2 includes a block 508, and PIXEL 3 includes a block 510. All of the formed blocks have the same height H due to the uniform application of microlens material 320 in FIG. 3. However, block 508 has a width W2 that is greater than the width W1 of blocks 506 and 510.

Figure 6:
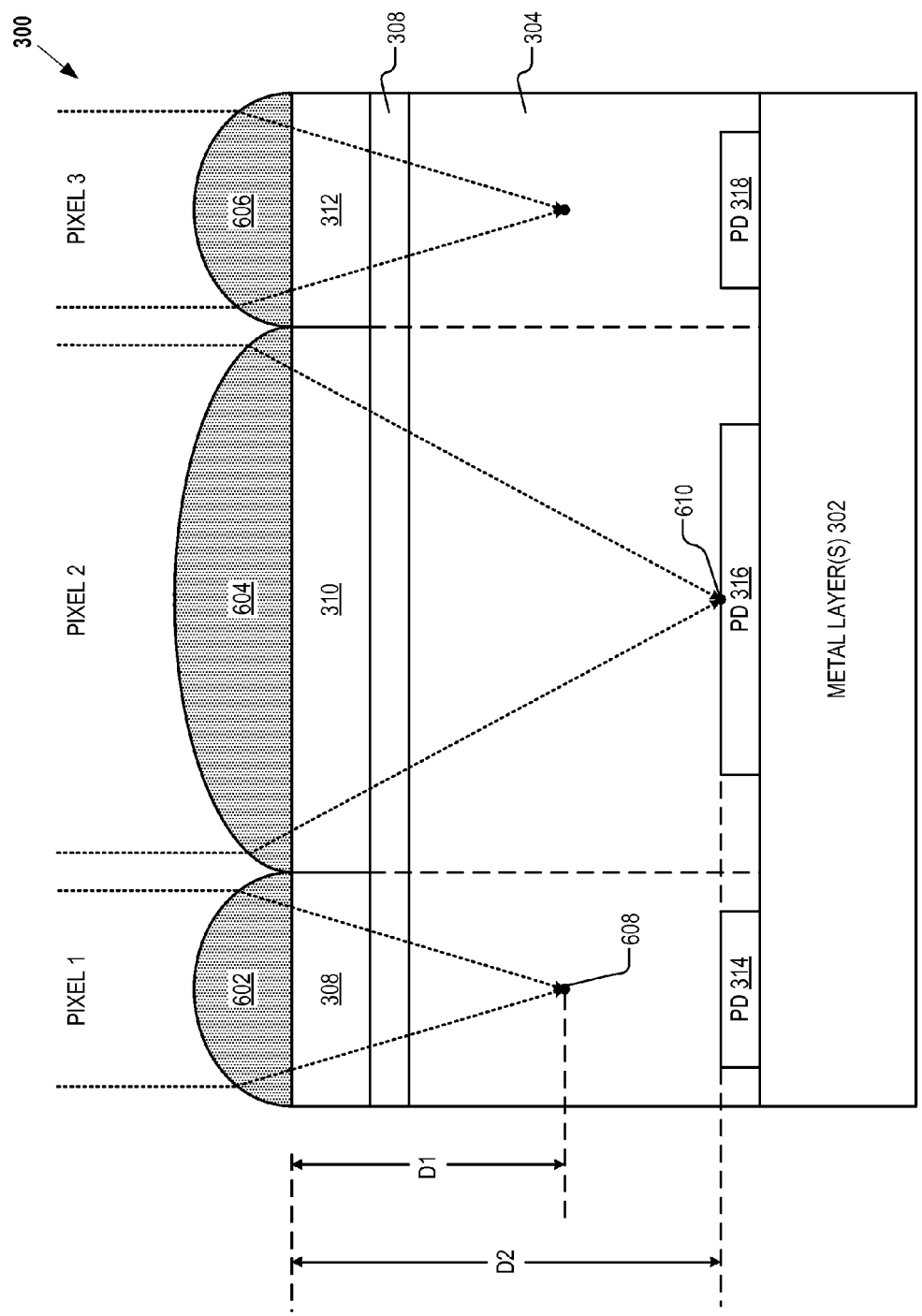

The blocks of microlens material may then be heated to reflow the microlens material to allow the surface tension of the heated microlens material to form the curved surface required for a microlens. FIG. 6 illustrates the formation of microlenses 602-606 after reflow of the blocks of microlens material. The radii of microlenses 602-606 depends, in part, on the volume of the microlens material as well as its surface tension. The smaller blocks of microlens material (e.g. 506 and 510) reflow into microlenses having a smaller radius and thus a shorter effective focal length. The larger blocks of microlens material (e.g., 508) reflow into microlenses having a larger radius with a longer effective focal length. To illustrate, FIG. 6 shows small-area PIXEL 1 having a focal point 608 at an effective focal length of D1, while large-area PIXEL 2 has a focal point 610 at a longer effective focal length of D2. The effective focal lengths may be approximated as the distance from the bottom-side of the microlens to the focal point, taking into consideration the characteristics of the medium in which light passes through (e.g., microlens, color filter, planarization layer, and substrate).

In some circumstances it may be less than optimal to have differing effective focal lengths between the large and small-area pixels. One approach to this problem may be to implement a multi-step process of forming blocks of microlens material of differing thicknesses. For example, one layer of microlens material may be applied at a first thickness, then exposed using a first photomask and developed. Next, a second layer of microlens material may be applied at a second thickness, then exposed using a second photomask and developed. This two-step process of forming blocks of microlens material of differing heights may allow for formation of microlenses that have similar effective focal lengths. That is, the microlenses over the small-area pixels may have a similar effective focal length as the microlenses over the large-area pixels. However, the multi-step process is costly, time-consuming, and may be susceptible to alignment errors between the first and second photomasks. For example, the exposure and development of the second layer of microlens material might dissolve or impact the shape of the first in an undesirable way. Accordingly, embodiments of the present invention provide for selectively adjusting the volume of the microlens material prior to reflow without the aforementioned drawbacks to achieve substantially equivalent effective focal lengths between both small-area and large-area pixels.

Figure 7:
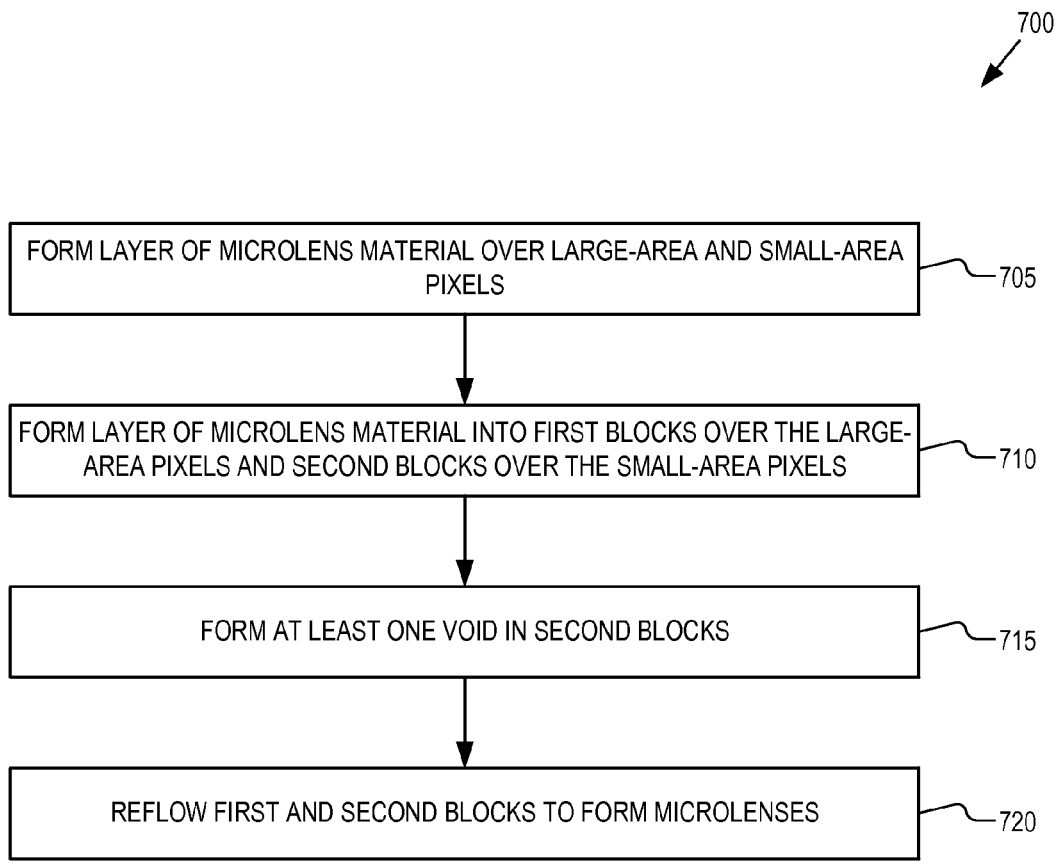
FIG. 7 is a flowchart illustrating a process of forming dual size microlenses, in accordance with an embodiment of the present disclosure.

By way of example, FIG. 7 is a flowchart illustrating a process 700 of forming dual size microlenses, in accordance with an embodiment of the present disclosure. Process 700 is a back-end process and begins with process block 705 which includes forming a uniform layer of microlens material on a light-incident side of the imaging sensor over both the large-area and small-area pixels. The formation of the layer of microlens material in process block 705 is similar to the formation of microlens material 320 of FIG. 3. Thus, the layer of microlens material may include a transparent thermoplastic that is disposed on the image sensor using spin-coating or blanket deposition techniques.

Figure 8:
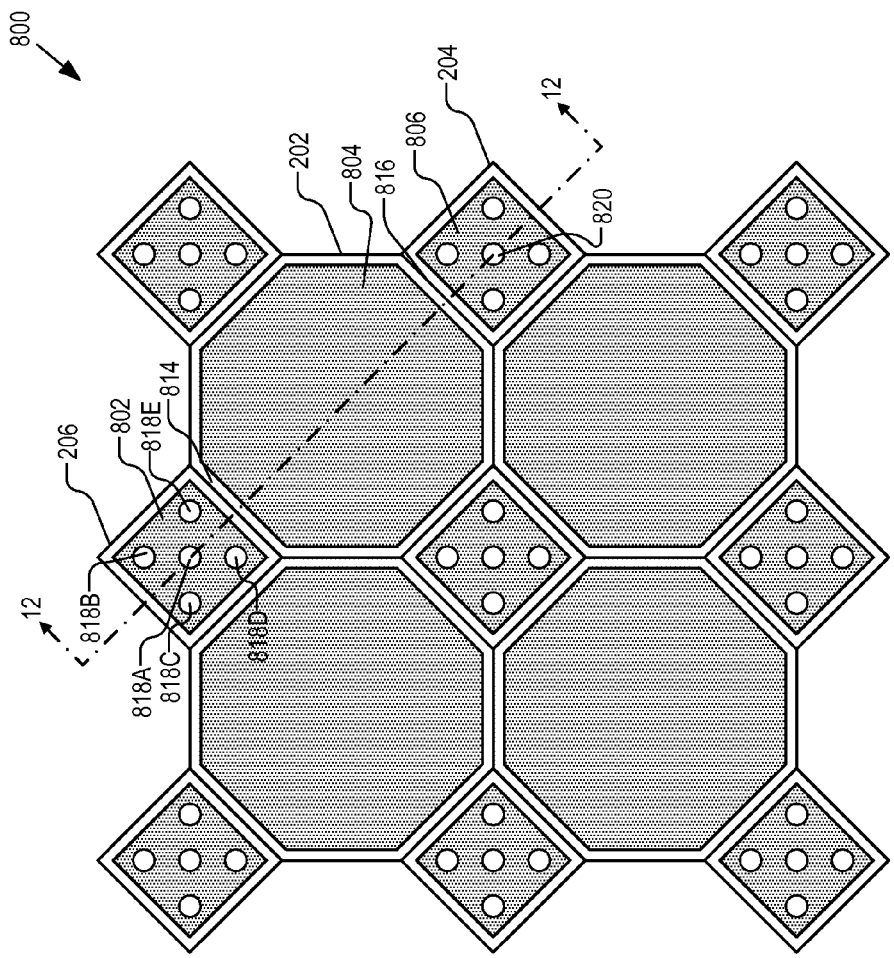
FIG. 8 is a plan view of an array of pixels of an imaging sensor having blocks of microlens material formed prior to reflow, in accordance with an embodiment of the present disclosure.

Next, in process block 710, the layer of microlens material is formed into a first set of large blocks disposed over the large-area pixels, and a second set of smaller blocks disposed over the small-area pixels. To illustrate, FIG. 8 is a plan view of an array of pixels 800 of an imaging sensor having blocks (e.g. blocks 802, 804, and 806) of microlens material formed prior to reflow, in accordance with an embodiment of the present disclosure. Blocks 802 and 806 of microlens material are formed over small-area pixels 206 and 204, respectively, while block 804 of microlens material is formed over large-area pixel 202. Blocks 802-806 are formed by creating gaps in the microlens material in the regions between the pixels. For example, process block 710 of forming the layer of microlens material into blocks may include forming gap 814 in the microlens material between pixels 206 and 202 and gap 816 between pixels 202 and 204. In one embodiment, each gap formed completely surrounds a respective block of microlens material so as to isolate it from adjacent blocks of microlens material.

As mentioned above, embodiments of the present invention provide for selectively adjusting the volume of the microlens material prior to reflow. Thus, process 700 includes process block 715, of forming at least one void in the smaller blocks of microlens material prior to reflow, so as to reduce the volume of microlens material included in these smaller blocks. To illustrate, FIG. 8 shows block 802 as including voids 818A-818E. In one embodiment voids 818A-818E are holes that are formed by removing some of the microlens material included in block 802. Also, although FIG. 8 illustrates block 802 as including five voids, any number of voids, including one or more, may be formed in the smaller blocks, including block 802, to reduce the volume of microlens material included in these smaller blocks.

In one embodiment, the voids in the smaller blocks of microlens material and the gaps that separate the microlens material into blocks may be formed at the same time and using the same processing step(s). Thus, voids 818A-818E may be formed simultaneously with gaps 814 and 816. As will be discussed in more detail below, one embodiment includes the simultaneous formation of the voids and the gaps through exposure of a photosensitive microlens material using a single photomask. Another embodiment includes the simultaneous formation of the voids and the gaps using a single etch-stop to etch the voids and gaps into the microlens material.

Referring now back to FIG. 7, after formation of the microlens material into small and large blocks, and after the formation of the voids in the smaller blocks, process block 720 next includes heating the blocks of microlens material to reflow them into microlenses. The voids formed in the smaller blocks of microlens material will close during the reflow and the surface tension will help to form relatively smooth lens surfaces. The diameter of the voids formed in the smaller blocks of microlens material must be small enough to close during reflow, yet large enough to be at least partially resolved/imaged and developed into the microlens material. If the diameter of the voids is too large, then the voids may not close during reflow causing imperfections or defects in the resulting microlens.

Figure 9:
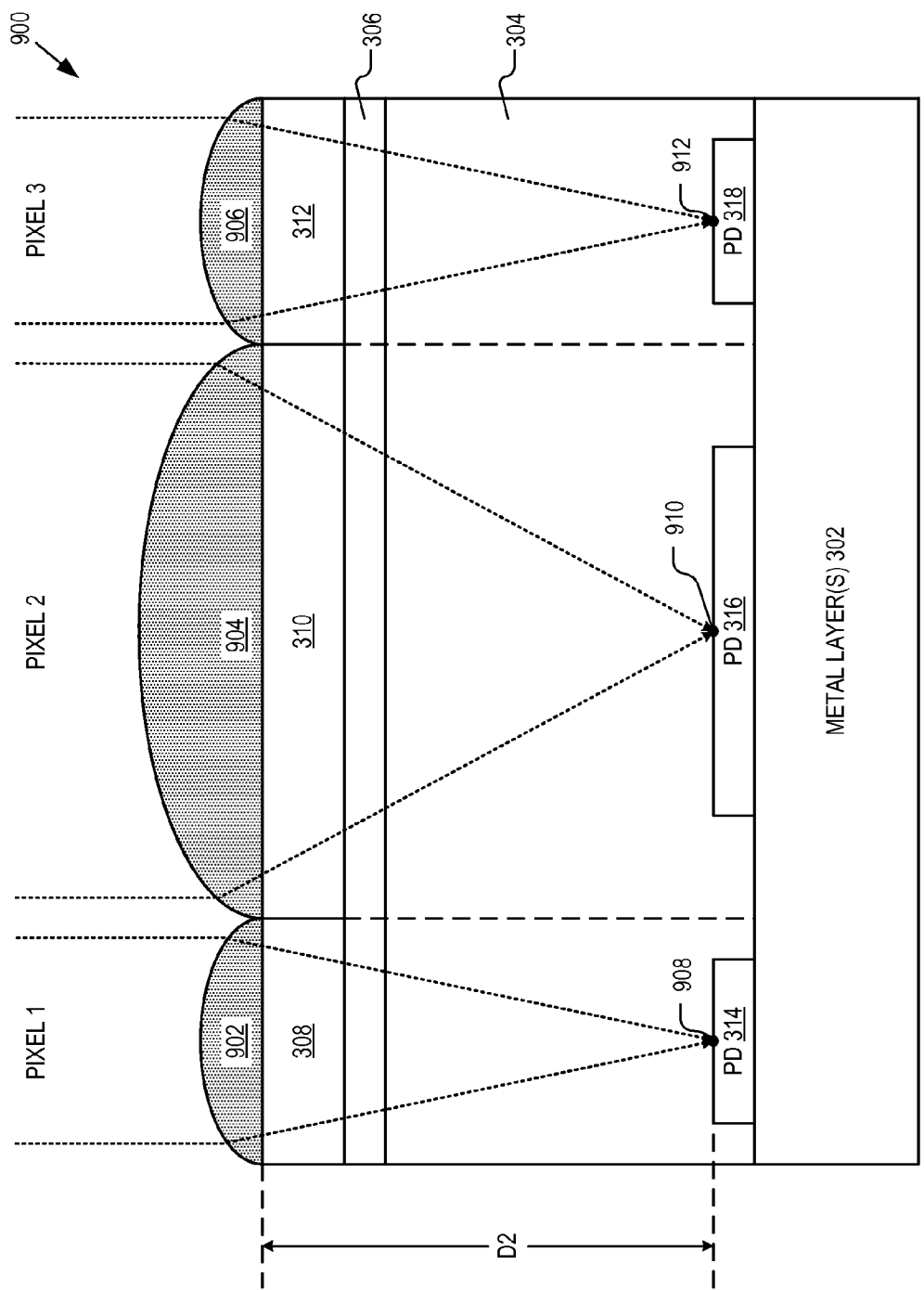
FIG. 9 is a cross-sectional view of the imaging sensor of FIG. 8 after reflow of the microlens material.

FIG. 9 is a cross-sectional view of the pixel array of FIG. 8 after reflow of the blocks of microlens material. As shown, imaging sensor 900 includes microlenses 902-906. However, the reduction in the volume of material in the smaller blocks of microlens material prior to reflow allows microlenses 902 and 906 to have a larger radius and thus longer effective focal lengths. In one embodiment, the amount of material removed from the smaller blocks of microlens material is determined so as to make the effective focal lengths of the small-area pixels substantially the same as the effective focal lengths of the large-area pixels. By way of example, FIG. 9 illustrates PIXEL 1 having a focal point 908, PIXEL 2 having a focal point 910, and PIXEL 3 having a focal point 912, where each of the focal points are at the same effective focal length D2.

Figure 10:
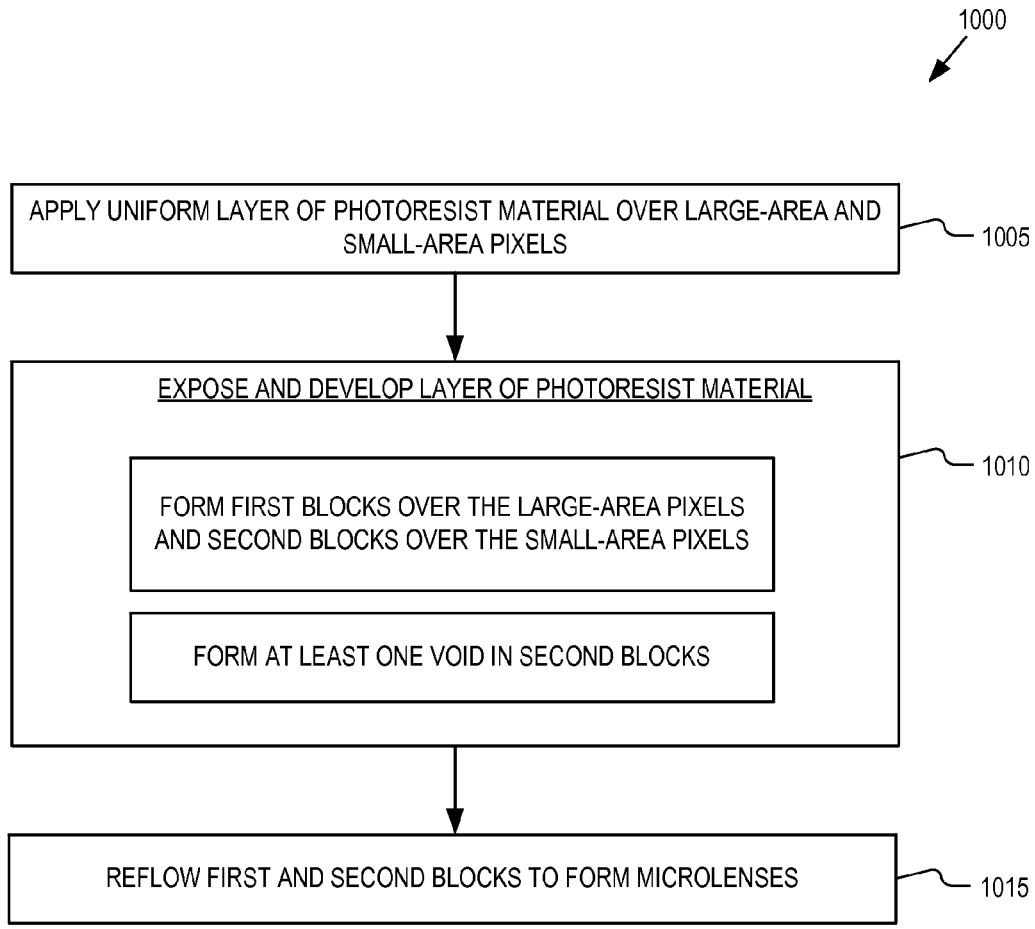
FIG. 10 is a flowchart illustrating a process of forming dual size microlenses using a photoresist as microlens material, in accordance with an embodiment of the present disclosure.

FIG. 10 is a flowchart illustrating a process 1000 of forming dual size microlenses using a photoresist as microlens material, in accordance with an embodiment of the present disclosure. Process 1000 begins with process block 1005 which includes forming a uniform layer of photoresist material on a light-incident side of the imaging sensor over both the large-area and small-area pixels. The formation of the layer of photoresist material in process block 1005 is similar to the formation of microlens material 320 of FIG. 3. The layer of photoresist material may include a photosensitive transparent thermoplastic that is disposed on the image sensor using spin-coating or blanket deposition techniques.

Figure 11:
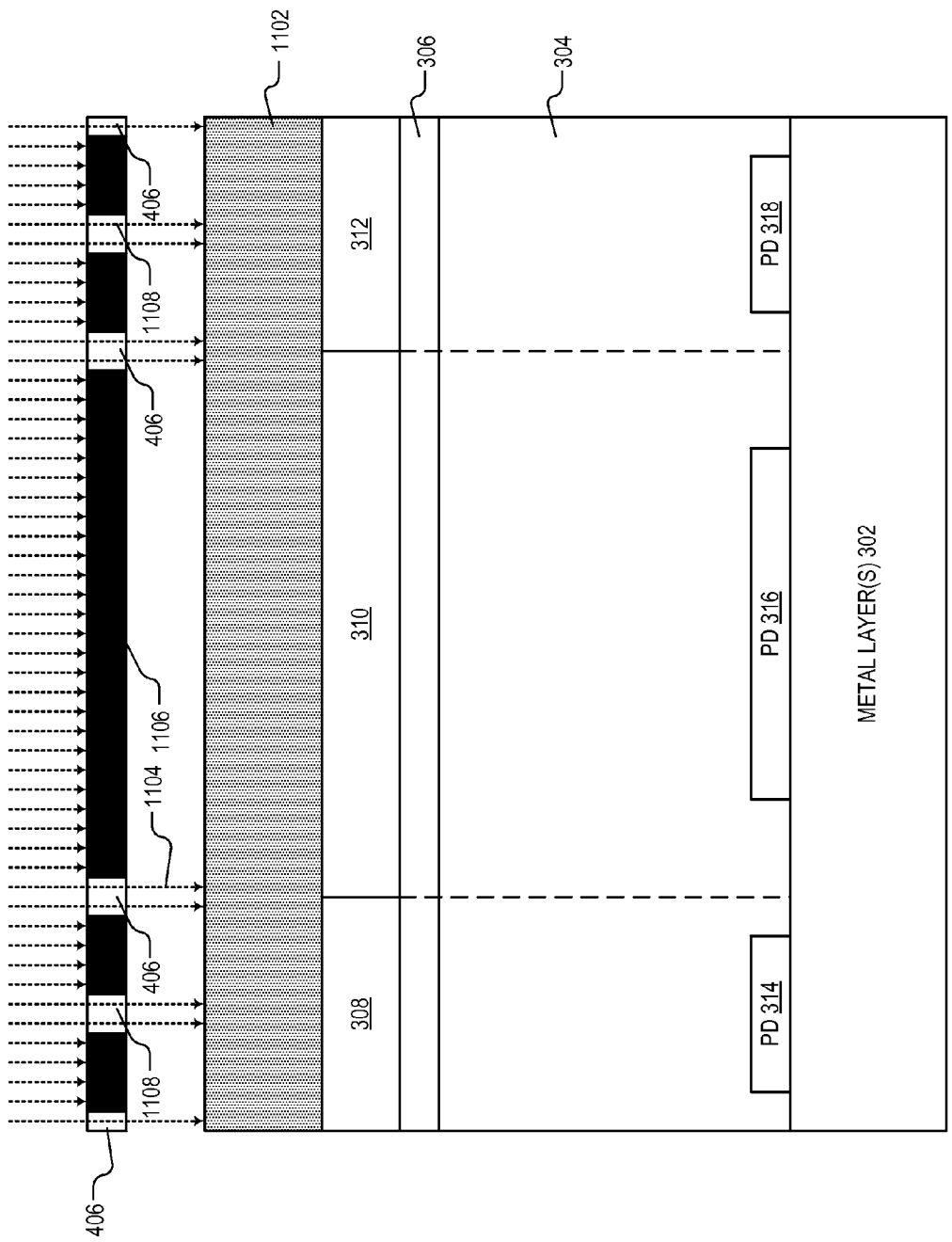
FIGS. 11 and 12 are cross-sectional views of an imaging sensor illustrating the process of FIG. 10.

Next, in process block 1010, the layer of photoresist material is exposed to a pattern of light and developed to form large and small blocks of photoresist material, as well as to form voids in the small blocks. FIG. 11 is a cross-sectional view of an imaging sensor illustrating the process of exposing photoresist layer 1102 to a pattern of light 1104. The pattern of light 1104 may be formed by shining light through photomask 1106. Photomask 1106 is similar to photomask 404 of FIG. 4 and even includes openings 406 for forming gaps in the photoresist layer 1102 between pixels. However, photomask 1106 includes additional openings 1108 to allow for the formation of voids in the photoresist layer 1102 at a location corresponding to where the small blocks of photoresist material are to be formed.

Figure 12:
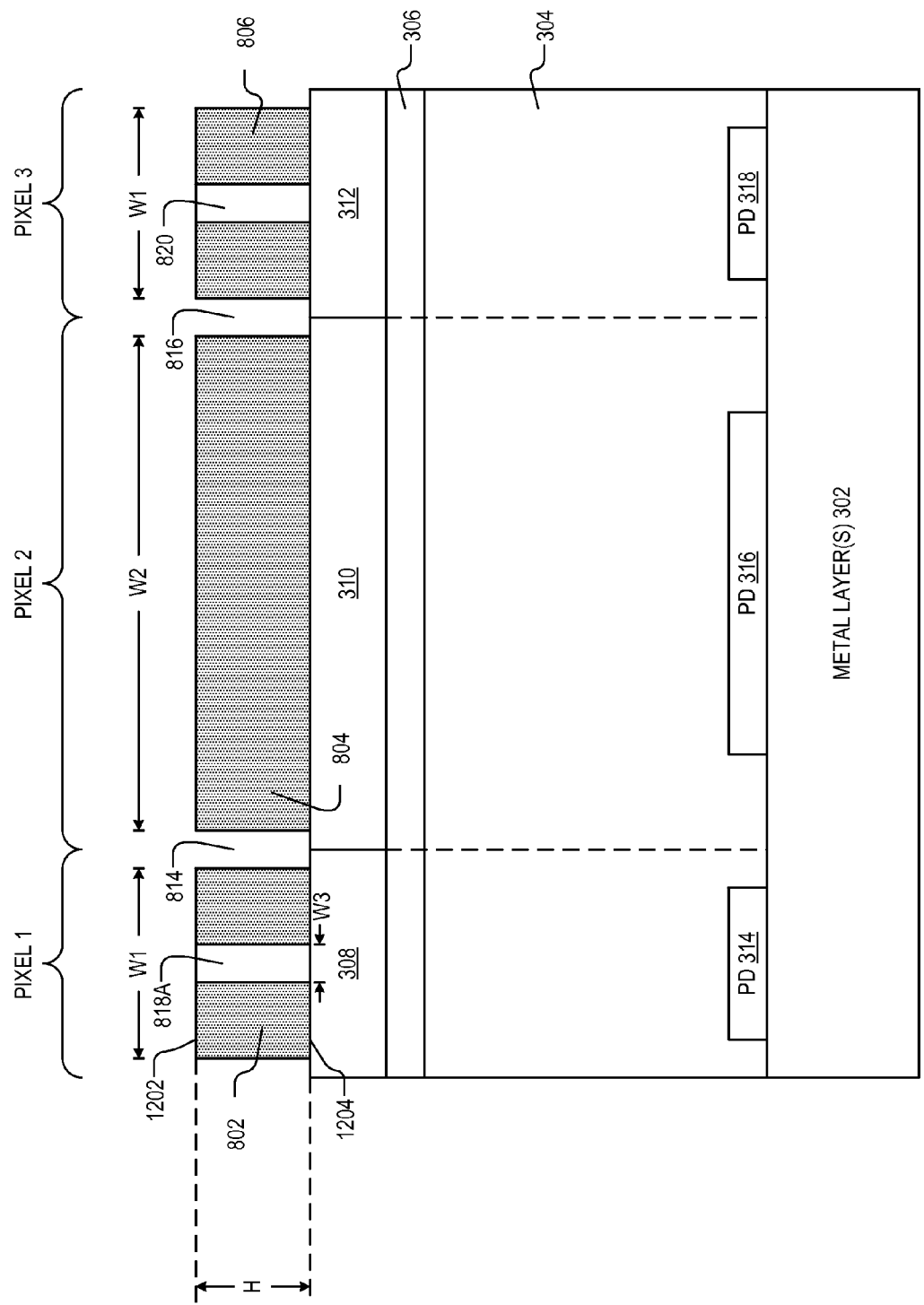

FIG. 12 illustrates the imaging sensor after exposure and development of the photoresist layer 1102. FIG. 12 is a cross-sectional view of pixel array 800 prior to reflow, taken along section line 12-12 of FIG. 8. Thus, PIXEL 1 may correspond to small-area pixel 206 of FIG. 8, while PIXEL 2 corresponds to large-area pixel 202, and PIXEL 3 corresponds to small-area pixel 204. As can be seen from FIG. 12, the exposure and development of photoresist layer 1102 using a single photomask 1106 allows for the simultaneous formation of gaps 814 and 816, and voids 818A and 820. That is, the formation of blocks 802-806 occurs at the same time and during the same processing step(s) as the formation of voids 818A and 820. All of the formed blocks have the same height H due to the uniform application of photoresist material in process block 1005 of FIG. 10. However, block 804 has a width W2 that is greater than the width W1 of blocks 802 and 806.

As can be seen from FIG. 12, both the voids (e.g., 818A and 820) and the gaps (e.g., 814 and 816) extend completely through from the top side 1202 to a bottom side 1204 of the photoresist material. Furthermore, voids 818A and 820 have a width (i.e., diameter) W3 that is substantially less than the width W1 of the small blocks (e.g., block 802). In one embodiment, the width W3 of the voids 818A and 820 is small enough to allow the voids to close during the subsequent reflow, yet large enough to be at least partially resolved/imaged and developed into the photoresist material.

Referring now back to FIG. 10, after formation of the photoresist material into small and large blocks, and after the formation of the voids in the smaller blocks, process block 1015 next includes heating the blocks of photoresist material to reflow them into microlenses. The voids (e.g., voids 818A and 820) formed in the smaller blocks of photoresist material will close during the reflow and the surface tension will help to form microlenses 902-906 of FIG. 9.

Figure 13:
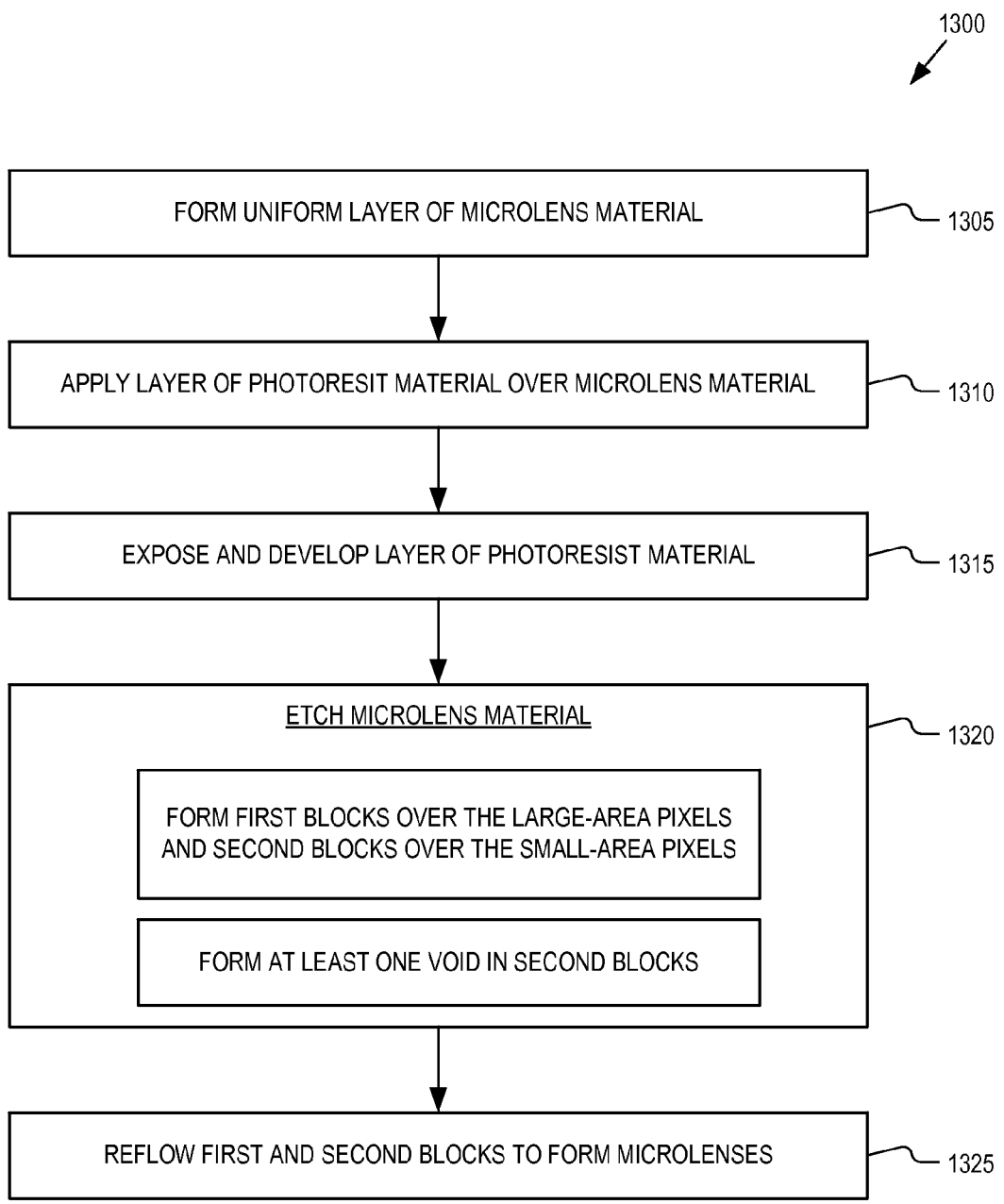
FIG. 13 is a flowchart illustrating a process of forming dual size microlenses using a photoresist as a etch-stop, in accordance with an embodiment of the present disclosure.

FIG. 13 is a flowchart illustrating a process 1300 of forming dual size microlenses using a photoresist layer as a etch-stop, in accordance with an embodiment of the present disclosure. Process 1300 begins with process block 1305 which includes forming a uniform layer of microlens material on a light-incident side of the imaging sensor over both the large-area and small-area pixels. The formation of the layer of microlens material in process block 1305 is similar to the formation of microlens material 320 of FIG. 3. The layer of microlens material may include a non-photosensitive transparent thermoplastic that is disposed on the image sensor using spin-coating or blanket deposition techniques.

Figure 14:
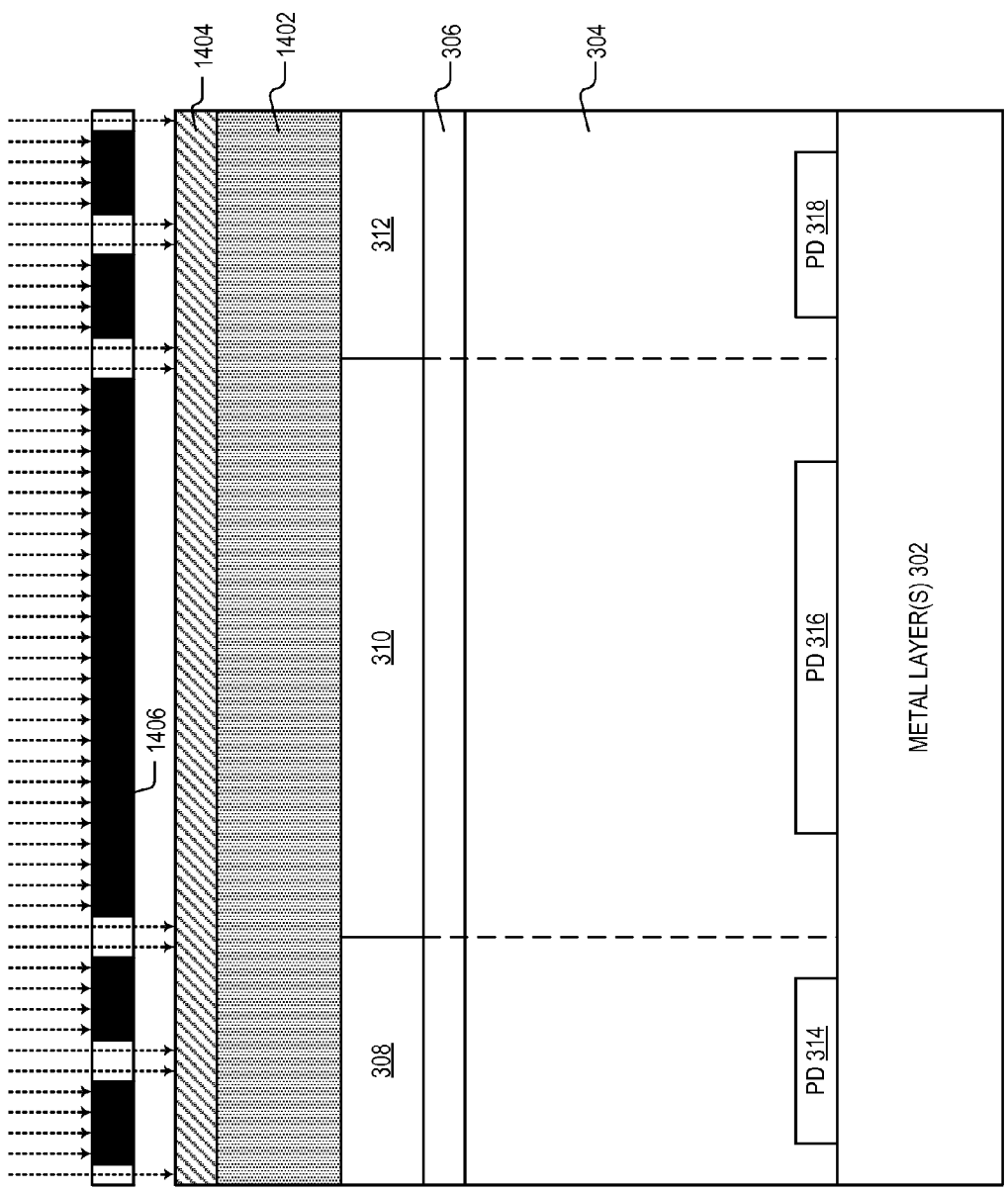
FIGS. 14-16 are cross-sectional views of an imaging sensor illustrating the process of FIG. 13.

Next, in process block 1310, a layer of photoresist is applied over the layer of microlens material. FIG. 14 is a cross-sectional view of an imaging sensor that illustrates a uniform layer of microlens material 1402 and a layer of photoresist material 1404 disposed thereon. The layer of photoresist material 1404 may be applied using spin-coating or blanket deposition techniques. Process 1300 then includes process block 1315 for exposing and developing the layer of photoresist material 1404. As shown in FIG. 14, the photoresist material 1404 is exposed to a pattern of light by shinning light (e.g., ultraviolet light) through photomask 1406. In one embodiment, photomask 1406 is the same photomask as photomask 1106 of FIG. 11 and includes openings in the mask corresponding to the location of gaps and voids to be formed in the layer of microlens material 1402.

Figure 15:
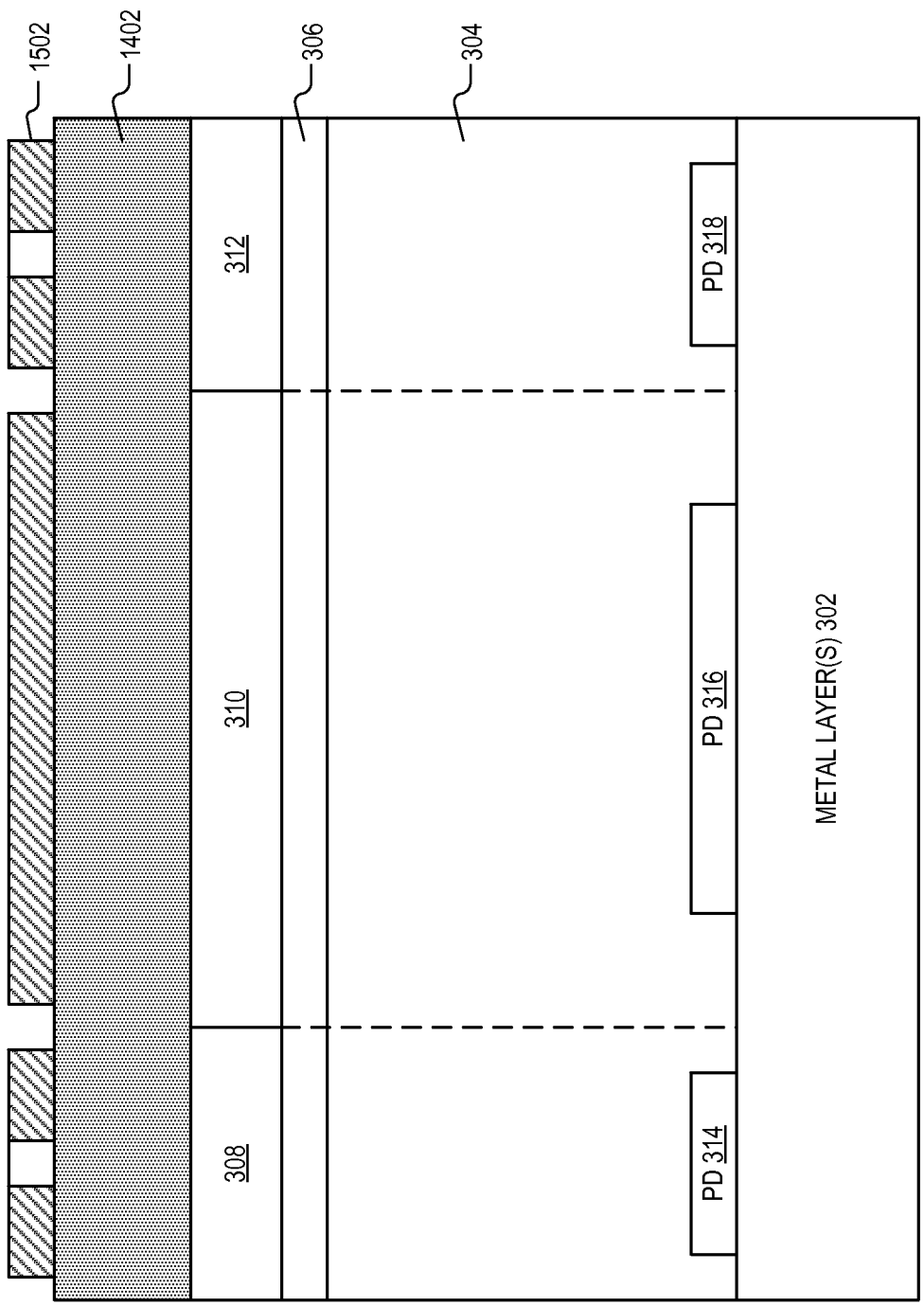
Figure 16:
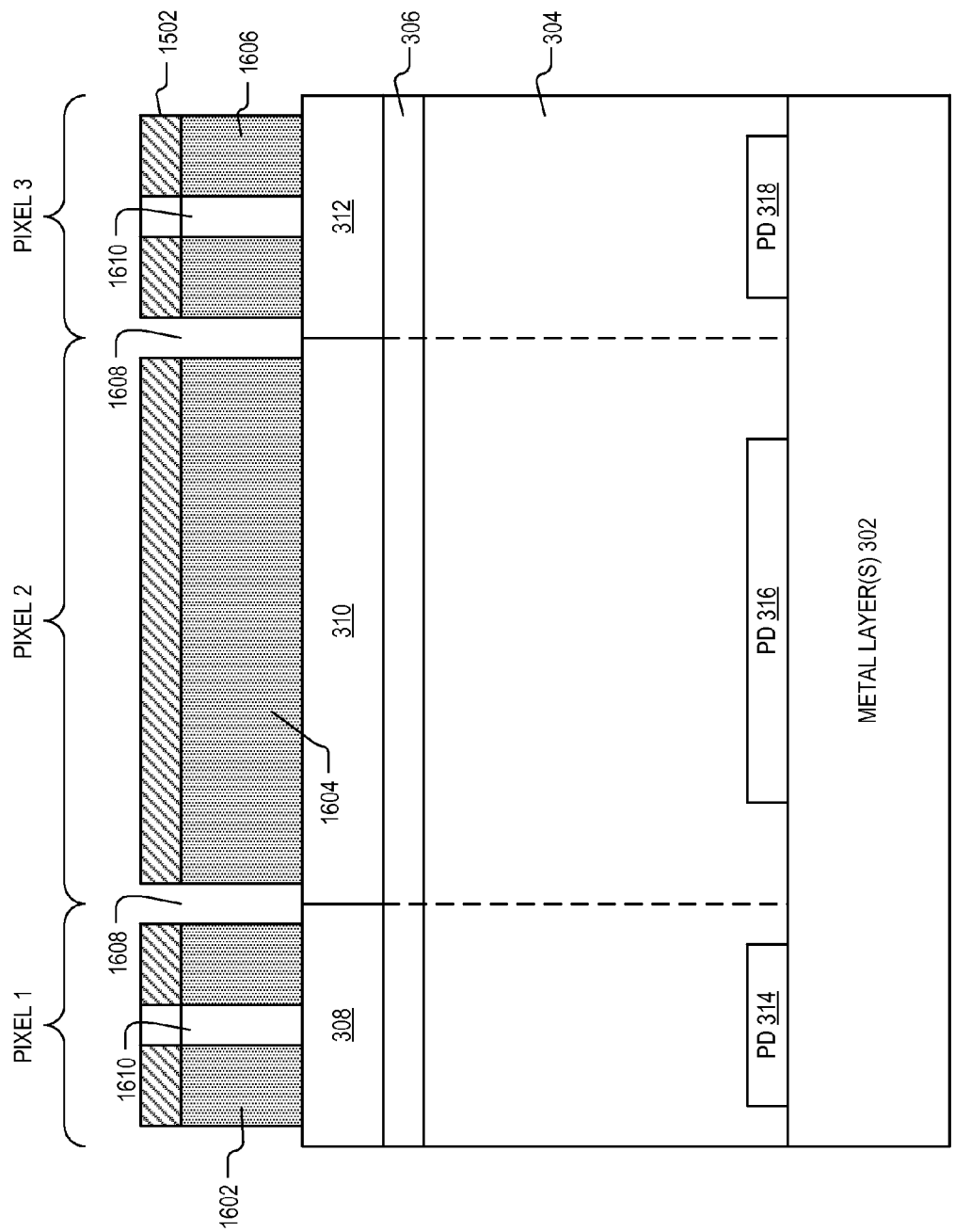

FIG. 15 illustrates the image sensor after exposure and development of photoresist material 1404 to form a patterned photoresist layer 1502. Referring now to process block 1320 of FIG. 13, the patterned photoresist layer 1502 is then used as an etch stop to simultaneously etch the gaps and voids into the layer of microlens material 1402. That is, the patterned photoresist layer 1502 prevents removal of the underlying microlens material in the location where the photoresist layer is present, while the exposed regions of microlens material 1402 are removed. In one embodiment, the etch is a dry etch to anisotropically remove the microlens material. As shown in FIG. 16, the etching of the microlens material 1402 allows for the formation of blocks 1602-1606 by creating gaps 1608 in the microlens material between pixels. The etching of the microlens material also allows for the formation of voids 1610 to reduce the volume of microlens material in the small blocks (e.g., blocks 1602 and 1606).

Returning now to FIG. 13, process 1300 next includes process block 1325 for removing the patterned photoresist layer 1502 and then heating the blocks of microlens material to reflow them into microlenses. The voids 1610 formed in the smaller blocks of microlens material will close during the reflow and the surface tension will help to form microlenses 902-906 of FIG. 9.

Figure 17:
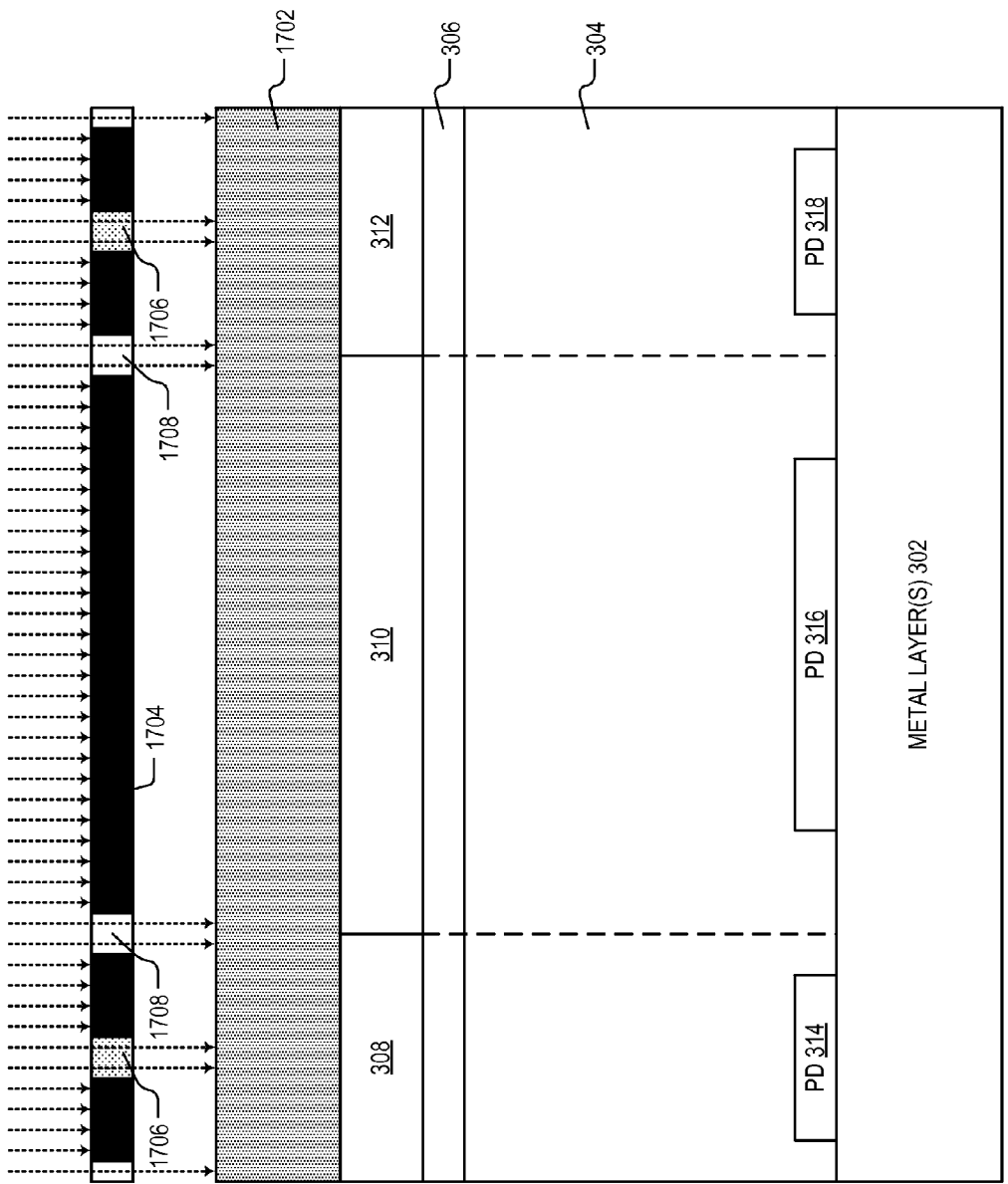
FIGS. 17 and 18 are cross-sectional views of an imaging sensor illustrating a process of forming dual size microlenses using a grayscale photomask, in accordance with an embodiment of the present disclosure.
Figure 18:
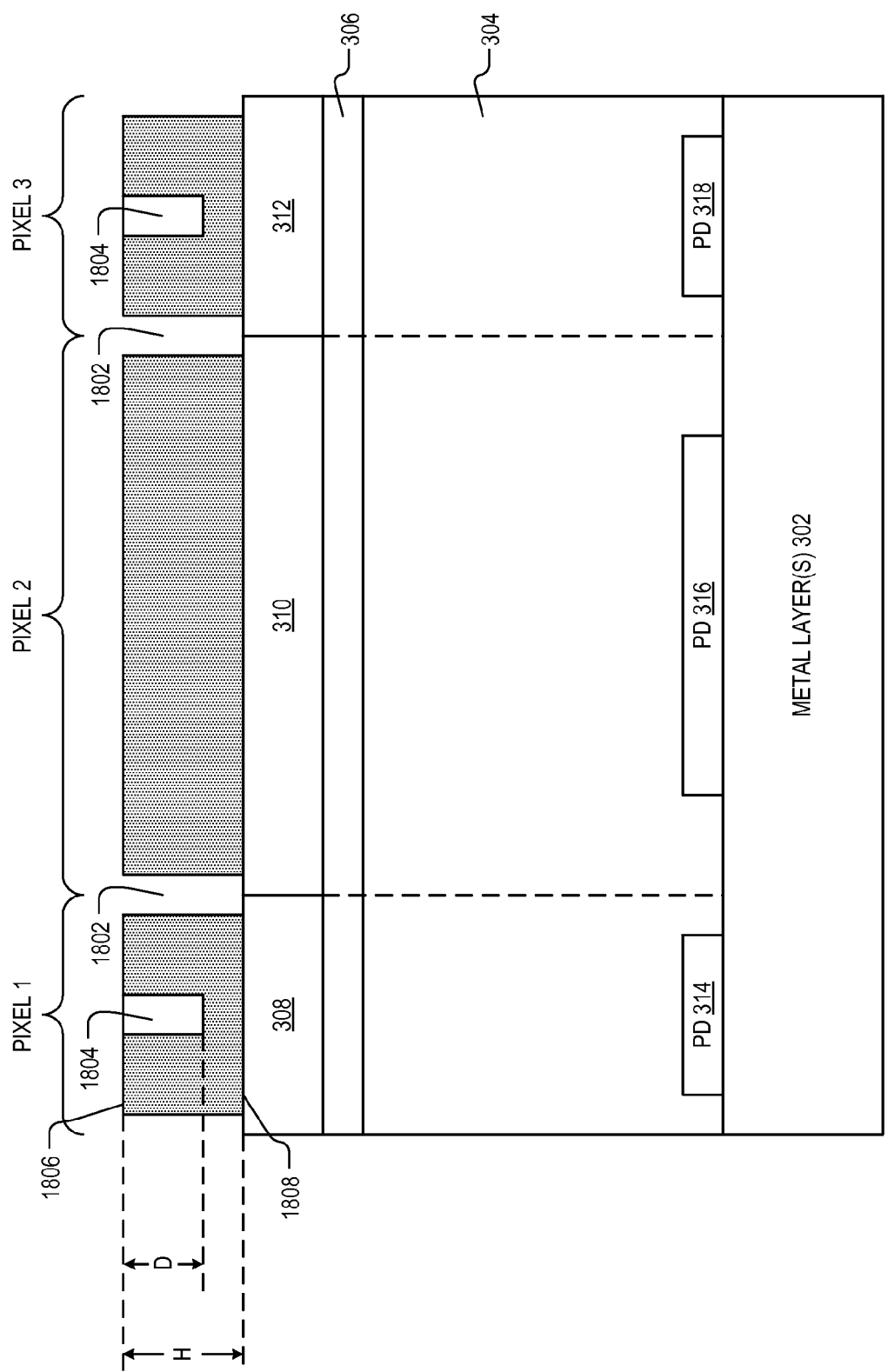

FIGS. 17 and 18 are cross-sectional views of an imaging sensor illustrating a process of forming dual size microlenses using a grayscale photomask 1704, in accordance with an embodiment of the present disclosure. Use of grayscale photomask 1704 allows the thickness of the photosensitive microlens material 1702 that remains after exposure and developing to vary due to the varying transmissiveness of the grayscale photomask 1704. The thickness of the remaining microlens material 1702 at a given location will depend on the transmissiveness of the grayscale photomask 1704 at that location. For example, openings 1706 in grayscale photomask 1704 may be less transmissive to light than openings 1708, such that the resultant gaps in the microlens material 1702 extend completely through from a top side to a bottom side of the microlens material 1702 while the resultant voids do not extend completely through the microlens material 1702.

For example, FIG. 18 illustrates the layer of microlens material 1702 (i.e., the photoresist) after exposure and development. As can be seen from FIG. 18, the exposure and development of the photosensitive layer of microlens material 1702 using a single grayscale photomask 1704 allows for the simultaneous formation of gaps 1802 and voids 1804. As can be seen from FIG. 18, both the gaps 1802 extend completely through from the top side 1806 to a bottom side 1808 of the microlens material while voids 1804 do not extend completely through the microlens material. Stated another way, all the formed blocks have a uniform height H, where the gaps 1802 extend the full height H, whereas the voids 1804 only extend a depth D as measured from the top side 1806 of the blocks, and where the depth D is less than the height H.

The blocks of microlens material in FIG. 18 are then heated to reflow them into microlenses. The voids 1804 formed in the smaller blocks of microlens material will close during the reflow and the surface tension will help to form microlenses 902-906 of FIG. 9.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of forming microlenses for an image sensor having at least one large-area pixel and at least one small-area pixel, the method comprising:
    forming a uniform layer of microlens material on a light incident side of the image sensor over the at least one large-area pixel and over the at least one small-area pixel;
    forming the layer of microlens material into a first block disposed over the at least one large-area pixel and into a second block disposed over the at least one small-area pixel;
    forming at least one void in the second block to reduce a volume of microlens material included in the second block; and
    reflowing the first block and the second block to form a respective first microlens and second microlens, wherein the first microlens has substantially the same effective focal length as the second microlens.

2. The method of claim 1, wherein the at least one void is formed at the same time and during the same processing step used to form the layer of microlens material into the first and second blocks.

3. The method of claim 1, wherein the at least one void extends completely through from a top side to a bottom side of the second block of microlens material.

4. The method of claim 1, wherein the first block of microlens material has a height that is substantially the same as a height of the second block and wherein a width of the first block is greater than a width of the second block.

5. The method of claim 1, wherein forming the uniform layer of microlens material includes applying a uniform layer of photoresist material on the light incident side of the image sensor over the at least one large-area pixel and over the at least one small-area pixel.

6. The method of claim 5, wherein forming the layer of microlens material into the first and second blocks includes exposing the layer of photoresist material to a pattern of light and developing the exposed layer to form a gap in the photoresist material between the at least one large-area pixel and the at least one small-area pixel.

7. The method of claim 6, wherein the exposing of the layer of photoresist material and developing the exposed layer includes exposing the layer of photoresist material and developing the exposed layer to simultaneously form the gap and the at least one void in the second block.

8. The method of claim 7, wherein the pattern of light used to expose the photoresist material is formed by a grayscale photomask, such that the gap extends completely through from a top side to a bottom side of the photoresist material and the at least one void does not extend completely through the photoresist material.

9. The method of claim 1, wherein the microlens material comprises a transparent thermoplastic.

10. The method of claim 9, wherein the transparent thermoplastic comprises Polymethyl Methacrylate (PMMA).

11. The method of claim 1, further comprising:
    applying a layer of photoresist material over the microlens material;
    exposing the layer of photoresist material to a pattern of light; and
    developing the exposed layer of photoresist material,
    wherein forming the layer of microlens material into the first and second blocks includes etching the microlens material using the exposed and developed layer of photoresist material as an etch stop to form a gap in the microlens material between the at least one large-area pixel and the at least one small-area pixel.

12. The method of claim 11, wherein etching the microlens material using the exposed and developed layer of photoresist material as an etch stop includes etching the microlens material to simultaneously form the gap and the at least one void in the second block.

13. The method of claim 1, wherein the image sensor is a complementary metal oxide semiconductor (CMOS) image sensor.

14. A method of forming microlenses for a complementary metal oxide semiconductor (CMOS) image sensor having at least one large-area pixel and at least one small-area pixel, the method comprising:
    applying a uniform layer of photoresist material on a light incident side of the image sensor over the at least one large-area pixel and over the at least one small-area pixel;
    exposing the layer of photoresist material to a pattern of light and developing the exposed layer to simultaneously:
        form the photoresist material into a first block disposed over the at least one large area pixel and into a second block disposed over the at least one small area pixel; and
        form at least one void in the second block to reduce a volume of the photoresist material included in the second block; and
    reflowing the first block and second block of photoresist material to form a respective first microlens and second microlens, wherein the first microlens has substantially the same effective focal length as the second microlens.

15. The method of claim 14, wherein the at least one void extends completely through from a top side to a bottom side of the second block of photoresist material.

16. The method of claim 14, wherein the first block of photoresist material has a height that is substantially the same as a height of the second block and wherein a width of the first block is greater than a width of the second block.

17. The method of claim 14, wherein forming the photoresist material into the first block disposed over the at least one large area pixel and into the second block disposed over the at least one small area pixel includes forming a gap in the photoresist material between the at least one large-area pixel and the at least one small area pixel.

18. The method of claim 17, wherein the pattern of light used to expose the photoresist material is formed by a gray-scale photomask, such that the gap extends completely through from a top side to a bottom side of the photoresist material and the at least one void does not extend completely through the photoresist material.

19. The method of claim 14, wherein the photoresist material comprises a transparent thermoplastic.

20. The method of claim 16, wherein the transparent thermoplastic comprises Polymethyl Methacrylate (PMMA).

* * * * *